US006865533B2

(12) United States Patent
Addison et al.

(10) Patent No.: US 6,865,533 B2
(45) Date of Patent: Mar. 8, 2005

(54) TEXT TO SPEECH

(75) Inventors: Edwin R. Addison, Millersville, MD (US); H. Donald Wilson, White Plains, NY (US); Gary Marple, Boxborough, MA (US); Anthony H. Handal, Westport, CT (US); Nancy Krebs, Severn, MD (US)

(73) Assignee: Lessac Technology Inc., White Plains, NY (US)

( * ) Notice: Subject to any disclaimer, the term of this patent is extended or adjusted under 35 U.S.C. 154(b) by 0 days.

(21) Appl. No.: 10/334,658

(22) Filed: Dec. 31, 2002

(65) Prior Publication Data

US 2003/0163316 A1 Aug. 28, 2003

Related U.S. Application Data

(63) Continuation of application No. 10/061,078, filed on Jan. 29, 2002, and a continuation of application No. 09/553,811, filed on Apr. 21, 2000, now abandoned, and a continuation-in-part of application No. 09/553,810, filed on Apr. 21, 2000.

(51) Int. Cl.[7] ............................................... G10L 15/26
(52) U.S. Cl. ....................................... 704/260; 704/270
(58) Field of Search ................................ 704/260, 270, 704/235

(56) References Cited

U.S. PATENT DOCUMENTS

| | | | |
|---|---|---|---|
| 4,783,803 A | 11/1988 | Baker et al. | |
| 4,866,778 A | 9/1989 | Baker | |
| 4,903,305 A | 2/1990 | Gillick et al. | |

(List continued on next page.)

FOREIGN PATENT DOCUMENTS

| | | |
|---|---|---|
| GB | 2323693 | 9/1998 |
| WO | WO 0182291 | 11/2001 |

OTHER PUBLICATIONS

U.S. Appl. No. 09/553,810, Filed: Apr. 21, 2000.
U.S. Appl. No. 10/335,226, Filed: Dec. 31, 2002.
U.S. Appl. No. 10/061,078, Filed: Jan. 29, 2002.

*Primary Examiner*—Richemond Dorvil
*Assistant Examiner*—Abul K. Azad
(74) *Attorney, Agent, or Firm*—Kirkpatrick & Lockhart LLP; Anthony H. Handal

(57) ABSTRACT

A preferred embodiment of the method for converting text to speech using a computing device having a memory is disclosed. The inventive method comprises examining a text to be spoken to an audience for a specific communications purpose, followed by marking-up the text according to a phonetic markup systems such as the Lessac System pronunciation rules notations. A set of rules to control a speech to text generator based on speech principles, such as Lessac principles. Such rules are of the tide normally implemented on prior art text-to-speech engines, and control the operation of the software and the characteristics of the speech generated by a computer using the software. A computer is used to speak the marked-up text expressively. The step of using a computer to speak the marked-up text expressively is repeated using alternative pronunciations of the selected style of expression where each of the tonal, structural, and consonant energies, have a different balance in the speech, are also spoken to a trained speech practitioners that listened to the spoken speech generated by the computer. The spoken speech generated by the computer is then evaluated for consistency with style criteria and/or expressiveness. And audience is then assembled and the spoken speech generated by the computer is played back to the audience. Audience comprehension of spoken speech generated by the computer is evaluated and correlated to a particular implemented rule or rules, and those rules which resulted relatively high audience comprehension are selected.

48 Claims, 5 Drawing Sheets

U.S. PATENT DOCUMENTS

| | | |
|---|---|---|
| 5,010,495 A | 4/1991 | Willetts |
| 5,027,406 A | 6/1991 | Roberts et al. |
| 5,231,670 A | 7/1993 | Golhor et al. |
| 5,393,236 A | 2/1995 | Blackmer et al. |
| 5,487,671 A | 1/1996 | Shpiro et al. |
| 5,636,325 A | 6/1997 | Farrett |
| 5,679,001 A | 10/1997 | Russell et al. |
| 5,717,828 A | 2/1998 | Rothenberg |
| 5,728,960 A | 3/1998 | Sitrick |
| 5,745,873 A | 4/1998 | Braida et al. |
| 5,766,015 A | 6/1998 | Shpiro |
| 5,787,231 A | 7/1998 | Johnson et al. |
| 5,791,904 A | 8/1998 | Russell et al. |
| 5,796,916 A | 8/1998 | Meredith |
| 5,799,279 A | 8/1998 | Gould et al. |
| 5,850,627 A | 12/1998 | Gould et al. |
| 5,864,805 A | 1/1999 | Chen et al. |
| 5,870,809 A | 2/1999 | Nishi |
| 5,890,123 A * | 3/1999 | Brown et al. ............ 704/270.1 |
| 5,903,864 A | 5/1999 | Gadbois et al. |
| 5,909,666 A | 6/1999 | Gould et al. |
| 5,920,837 A | 7/1999 | Gould et al. |
| 5,946,654 A | 8/1999 | Newman et al. |
| 5,960,394 A | 9/1999 | Gould et al. |
| 6,055,498 A | 4/2000 | Neumeyer et al. |
| 6,071,123 A | 6/2000 | Tallal et al. |
| 6,081,780 A | 6/2000 | Lumelsky |
| 6,144,939 A | 11/2000 | Pearson et al. |
| 6,188,984 B1 | 2/2001 | Manwaring et al. |
| 6,249,763 B1 | 6/2001 | Minematsu |
| 6,253,182 B1 | 6/2001 | Acero |
| 6,266,637 B1 | 7/2001 | Donovan et al. |
| 6,505,158 B1 * | 1/2003 | Conkie ....................... 704/260 |

* cited by examiner

TEXT TO SPEECH

CROSS REFERENCE TO RELATED APPLICATIONS

The present invention is a continuation in part ("CIP") of U.S. patent application Ser. No. 09/533,810 filed on Apr. 21, 2000 entitled "Speech Recognition Method" with a Request for Continued Examination filed Dec. 14, 2002, which in turn is a continuation of the examination of U.S. patent application Ser. No. 09/553,810 entitled "Speech Recognition Method" filed Apr. 21, 2000, U.S. patent appplication Ser. No. 09/553,811 entitled "Speech Training Method" filed Apr. 21, 2000, now abandoned, and U.S. patent application Ser. No. 10/061,078 entitled "Text to Speech"filed Jan. 29, 2002.

BACKGROUND OF THE INVENTION

While speech to text applications have experienced a remarkable evolution in accuracy and usefulness during the past ten or so years, pleasant, natural sounding easily intelligible text to speech functionality remains an elusive but sought-after goal.

This remains the case despite what one might mistake as the apparent simplicity of converting known syllables with known sounds into speech, because of the subtleties of the audible cues in human speech, at least in the case of certain languages, such as English. In particular, while certain aspects of these audible cues have been identified, such as the increase in pitch at the end of a question which might otherwise be declaratory in form, more subtle expressions in pitch and energy, some speaker specific, some optional and general in nature, and still others word specific, combine with individual voice color in the human voice to result in realistic speech.

In accordance with the invention, elements of individual speaker color, randomness, and so forth are incorporated into output speech with varying degrees of implementation, to achieve a pseudo-random effect. In addition, speaker color is integrated with the same and combined with expressive models patterned on existing conventional speech coach to student voice training techniques. Such conventional techniques may include the Lessac system, which is aimed at improving intelligibility in the human voice in the context of theatrical and similar implementations of human speech.

In contrast to the inventive approach, conventional text to speech technology has concentrated on a mechanical, often high information density, approach. Perhaps the most convincing text to speech approach is the use of prerecorded entire phrases, such as those used in some of the more sophisticated telephone answering applications. An example of such an application is Wildfire (a trademark), a proprietary system available in the United States. In such systems, the objective is to minimize the number of dialog options in favor of prerecorded phrases with character, content and tonality having a nature which is convincing from an expressive standpoint. For example, such systems on recognizing an individual's voice and noting a match to the phone number might say: "Oh, hello Mr. Smith", perhaps with an intonation of pleasure or surprise. On the other hand, if a voice recognition software in the system determines that the voice is not likely that of Mr. Smith, despite the fact that it has originated from his telephone line, the system may be programmed to say: "Is that you, Mr. Smith?", but in an inquisitive tone. In the above examples, the above phrase spoken by a human speaker is recorded in its entirety. However, the amount of memory required for just a very few responses is relatively high and versatility is not a practical objective.

Still another approach is so-called "phrases placing" such as that disclosed in Donovan, U.S. Pat. No. 6,266,637, where recorded human speech in the form of phrases is used to construct output speech. In addition, in accordance with this technology, the characteristics of segments of speech may be modified, for example by modifying them in duration, energy and pitch. In related approaches, such as utterance playback, some of the problems of more limited systems are solved, such approaches tend to be both less intelligible and less natural than human speech. To a certain extent blending of prerecorded speech with synthetic speech will also solve some of these problems, but the output speech, while versatile and having wider vocabularies, is still relatively mechanical and character.

Still another approach is to break up speech into its individual sounds or phonemes, and then to synthesize words from these sounds. Such phonemes may be initially recorded human speech, but may have their characteristics varied so that the resulting phoneme has a different duration, pitch, energy or other characteristics or characteristics changed as compared to the original recording. Still another approach is to make multiple recordings of the phonemes, or integrate multiple recordings of words with word generation using phoneme building blocks.

Still a further refinement is the variation of the prosody, for example by independently changing the prosody of a voiced component and an unvoiced component of the input speech signal, as is taught by U.S. Pat. No. 6,253,182 of Acero. In addition, the frequency-domain representation of the output audio may be changed, as is also described in Acero.

Concatenative systems generate human speech by synthesizing together small speech segments to output speech units from the input text. These output speech units are then concatenated, or played together to form the final speech output by the system. Speech may be generated using phonemes, diphones (two phonemes) or triphones (three phonemes). In accordance with the techniques described by Acero, the prosody of the speech unit, defined by its pitch and duration, may be varied to convey meaning, such as in the increase in pitch at the end of a question.

Still other text to speech technology involves the implementation of technical pronunciation rules in conjunction with the text to speech transformation of certain combinations of certain consonants and/or vowels in a certain order. See for example U.S. Pat. No. 6,188,984 of Manwaring et al. One aspect of this approach is recognizing the boundaries between syllables and applying the appropriate rules.

As can be seen from the above, current approaches for text to speech applications proceed at one end of the spectrum from concatenated sentences, phrases and words to word generation using phonemes. While speech synthesis using sub-word units lends itself to large vocabularies, serious problems occur where sub-word units are spliced. Nevertheless, such an approach appears, at this time, to constitute the most likely model for versatile high vocabulary text to speech systems. Accordingly, addressing prosody issues is a primary focus. For example, in U.S. Pat. No. 6,144,939 of Pearson, the possibility of a source-filter model that closely ties the source and filter synthesizer components to physical structures within the human vocal tract is suggested. Filter parameters are selected to model vocal tract effects, while source waveforms model the glottal source. Pearson is concerned, apparently, with low memory systems, to the extent that full syllables are not even stored in the system, but rather half syllables are preferred.

Interestingly, this approach mimics the Assyro-Babylonian alphabet approach which involved use of consonants with various vowel additions respectively before and after each consonant corresponding to sounds represented by individual alphabets.

SUMMARY OF THE INVENTION

A method for converting text to speech using a computing device having memory is disclosed. A text is received into the memory of the computing device. A set of the lexical parsing rules are applied to parse the text into a plurality of components. Pronunciation, and meaning information is associated with these components. A set of phrase parsing rules are used to generate marked up text. The marked up text is then phonetically parsed using phonetic parsing rules, and Lessac expressive parsing rules. The sounds are then stored in the memory of the computing device, each of the sounds being associated with pronunciation information. The sounds associated with the text maybe recalled to generate a raw speech signal from the marked up text after the parsing using phonetic and expressive parsing rules.

In a preferred embodiment of the method for converting text to speech using a computing device having a memory is disclosed. Text, being made up of a plurality of words, is received into the memory of the computing device. A plurality of phonemes are derived from the text. Each of the phonemes is associated with a prosody record based on a database of prosody records associated with a plurality of words. A first set of the artificial intelligence rules is applied to determine context information associated with the text. The context influenced prosody changes for each of the phonemes is determined. Then a second set of rules, based on Lessac theory to determine Lessac derived prosody changes for each of the phonemes is applied. The prosody record for each of the phonemes is amended in response to the context influenced prosody changes and the Lessac derived prosody changes. Then a reading from the memory sound information associated with the phonemes is performed. The sound information is amended, based on the prosody record as amended in response to the context influenced prosody changes and the Lessac derived prosody changes to generate amended sound information for each of the phonemes. Then the sound information is outputted to generate a speech signal.

It is further disclosed that the prosody of the speech signal is varied to increase the realism of the speech signal. Further, the prosody of the speech signal can be varied in a manner which is random or which appears to be random, further increasing the realism.

The sound information is associated with different speakers, and a set of artificial intelligence rules are used to determine the identity of the speaker associated with the sound information that is to be output.

Additionally, the prosody record can be amended in response to the context influenced prosody changes, based on the words in the text and their sequence. The prosody record can also be amended in response to the context influenced prosody changes, based on the emotional context of words in the text. When these prosody changes are combined with varied prosody of the speech signal, sometimes varied in a manner that appears random, realism is further increased.

The sound information generated is associated with different speakers, and a set of artificial intelligence rules are used to determine the identity of the speaker associated with the sound information that is to be output. Further, the prosody record can be amended in response to the context influenced prosody changes, based on the words in the text and their sequence.

In over fifty years of work, Arthur Lessac has developed a complete voice system reflecting, for the first time, the basic relationship between music and speech. His discovery and development was done empirically but was related to much formal academic work. His work early linked an understanding of music and singing with voice theory and rests on his decision to make a radical departure from traditional methods of studying and teaching voice. Very early in his speech work, Lessac decided that teaching or learning by imitating others was insufficient and damaging. He determined to develop a system of learning based upon sensation and feeling and kinesthetic feedback principles. This required extensive practical and formal study of the natural functioning of the body and the voice.

During almost this same fifty-year period, music historians began to go beyond studies of the history of western classical music. Inter-cultural studies linked western, eastern, African and other music. Related anthropological, archeological, historic and music work began to provide some insight into the origins of speech and music. Since these origins were before the time of recorded history, little progress was made until a number of studies of still-existing primitive tribes. No one has, as yet, described the whole relationship between music and speech as has Lessac. However, there are indications that recent studies would support his main thesis.

Today no complete vocal system compares to the Lessac system. A voice system must deal with two functional aspects and one operational aspect of speech.

Functionally, speech consists of vowels and consonants. Operationally, there is the linking together within a word, sentence, paragraph or speech of the different sounds where different emphasis can vary meaning. The connection between vowel sounds and music has long been recognized—though never in a phonetic system. However, the same connection between the functional characterisitics of consonants and musical instruments and between the relationship between speech and a musical score has never before been developed.

Voice and speech theory and training today depends heavily upon the International Phonetic Alphabet (IPA). The IPA was created a century ago by a committee of Western European scholars. The IPA is fine for mapping sound. It does remove orthographic traps, and it provides the student with a guide to specific vowel and consonant sounds in other languages that are missing in his own, although even in this context it does little more than any other alphabet when the spelling of a given language—Spanish, for example—is simplified. But, it is a weak and artificial tool for teaching live people how they should sound. It is cumbersome, complicated, and outdated. It encourages a non-creative approach that is acoustic, imitative and mechanical. And, it includes too many vocal traps.

A symbol from the IPA system maps all of the possible sounds of the language, separating out deviations due to regional genesis which do not discriminate meaning within the culture. This symbol must then be learned or memorized in conjunction with a sound (thus, involving the ear) in order to be understood and then spoken.

And, the IPA does not deal at all with the operational linking together of sounds within words, phrases and larger units of speech. It is not a vocal system—merely an attempt at some definition of comparative sounds.

Functionally, Lessac vowels are "numeric and kinesthetic", and Lessac consonants are "imagistic, kinesthetic and potentially numeric" in contrast to the purely symbolic nature of the IPA vowel and consonant phonetics.

Operationally, Lessac's methods of "exploration" and the elimination of any basic difference between singing and speaking utilize the basic musical qualities in all uses of the voice.

At the same time, the Lessac voice system includes and adapts important elements from previous systems of acoustic phonetics, articulatory phonetics, auditory phonetics and physiological phonetics.

In the Lessac Vowel System, the numbers directly connect to a structure and kinesthetic feel which, when replicated, creates the desired sound without necessitating control by the ear, and, thus, avoiding the conditioned pitfalls of poor vocal environment. Based on a direct transfer from numeric description to action, this method of learning leaves no room for intervening influences to dilute or interfere with the process. In addition, the vowel is fed by a vibratory and resonance feel that aids in enforcing the phonetic value and provides a significant qualitative component to what in other systems remain, by and large, a quantitative dimension.

In this way, the Lessac vowel system eliminates the IPA concept of front, middle and back vowels, or high and low vowels; it discourages the mechanistic handling of glottal, pharyngeal, velar, palatal, retroflex, dental, labial manipulations; it avoids reliance upon the ear for essential control.

The Lessac Consonant System (described at pages 129–179 of Arthur Lessac's THE USE AND TRAINING OF THE HUMAN VOICE, Drama Book Publishers 1967), relates consonants to musical instruments. Each of the consonants reflects a musical instrument and involves both the sound and the image of the playing of the instrument—images of touch, rhythm, melody, size and subtlety.

To understand the instrument means to understand not only the sound itself but also the kinesthetic feel of the way the instrument is played and the different uses to which it can be put. It is an aesthetic construction and functions as a physical image.

In conventional voice and speech training, even when the habit is more or less automatic, the sight of a "T" or a "V" will prepare the tongue and gum-ridge of the lips to execute the action to produce the desired explosive or fricative sound, but the sound that comes out is often unanticipated, irregular, defective and undetected by the ear.

The impression often is that there must be at least a half dozen ways of making the sound.

In the Lessac Consonant System, the picture of a snare drum with a "T" written on the picture will, after one has been taught the aesthetics of a drum beat, bypass and cut through the complexities of tongue manipulation, the memories of imitation, the listening by ear, etc. The student is not only make a perfect "T" sound but will thereby also know how to feel the drumbeats of the "K", "P", "D", "B", and "G" without any additional training. What is more, once the concept is clear, one can ask a deaf person, or a foreigner, whether Chinese or French, to feel an "R"—trombone, or a "V"—cello, or an "5"—sound effect, or a "CH"—cymbal. The result has been shown to be clear and perfect every time without ear judgment, mental confusion, physical or physiological gymnastics, and unaffected by any previous cultural or sectional influences that might work against this articulation.

Traditionally, the study of voice and speech is divided into different disciplines—voice for singing, voice for speech, diction, public speaking, therapy, etc. However, fundamental Lessac concepts serve all disciplines. All voice and speech is basically musical with the difference between speaking and singing being a relative one.

Traditionally, consonants have been thought of as "articulated" sounds—primarily important for intelligibility. The Lessac instrumental approach to consonants suggests a reversal of the relative position of vowels and consonants in singing and speaking. In singing, the vowels make the principal artistic contribution; the consonants a utilitarian one. But, in general speech, the consonants carry most of the melody and rhythm, while the vowels serve primarily for emphasis.

As the student comes to understand that the voice and speech with its vowels and consonants have a symphonic quality and range, and that one can "play" the voice in a musical and instrumental way, one comes to use another, total image in speaking, namely, the image of an orchestra playing a piece of music.

In teaching through an organized and related group of images, the Lessac approach directs focus to the exploration at hand and perhaps obviates most of the inhibitory and competing response pattern a normal learning situation implicitly contains. It is sometimes difficult to communicate, but when communicated, it contains a tremendous amount of information in a "chunked" and, therefore, memorized state. Through a special kind of learning, images chunk information.

Many people on first understanding the Lessac voice theory assume that his use of musical instruments to teach consonants and his overall musical approach is simply a useful teacher's analogy—or, if they disagree with it, a "trick" of some kind. However, studies of the origins of music suggest that the relationship between music and speech and, within that, between consonants and musical instruments appears to be a fundamental one. In all cultures, the development of specific instruments and vocal sounds appears to have been an inter-related process. Certain instruments were built to mirror the image or sound of the vocal instrument and certain vocal sounds were made to mirror pleasing instrumental images or sounds—such as, basic percussive sounds, the twang of a bow string or the tone of an early horn.

The Lessac consonant system applied to English reflects the instruments of Western European culture and its symphony orchestra. Though the basic instruments are the same in all cultures the drum, the horn, the stringed instrument, etc., specific variations reflecting specific different consonant sounds remain to be defined as the Lessac voice system is applied to languages in other cultural settings.

The inventive method comprises examining a text to be spoken to an audience for a specific communications purpose, followed by marking-up the text according to a phonetic markup systems such as the Lessac System pronunciation rules notations. A set of rules to control a speech to text generator based on speech principles, such as Lessac principles. Such rules are of the tide normally implemented on prior art text-to-speech engines, and control the operation of the software and the characteristics of the speech generated by a computer using the software. A computer is used to speak the marked-up text expressively. The step of using a computer to speak the marked-up text expressively is repeated using alternative pronunciations of the selected style of expression where each of the tonal, structural, and consonant energies, have a different balance in the speech, are also spoken to a trained speech practitioners that listened to the spoken speech generated by the computer. The spoken speech generated by the computer is then evaluated for consistency with style criteria and/or expressiveness. And audience is then assembled and the spoken speech generated by the computer is played back to the audience. Audience comprehension of spoken speech generated by the computer is evaluated and correlated to a particular implemented rule or rules, and those rules which resulted relatively high audience comprehension are selected.

BRIEF DESCRIPTION OF THE DRAWINGS

The function, objects and advantages of the invention will become apparent from the following description taken in conjunction with the drawings which illustrated only several embodiments of the invention, and in which.

DETAILED DESCRIPTION OF THE BEST MODE

In accordance with the present invention, an approach to voice synthesis aimed to overcome the barriers of present system is provided. In particular, present day systems based on pattern matching, phonemes, di-phones and signal processing result in "robotic" sounding speech with no significant level of human expressiveness. In accordance with one embodiment of this invention, linguistics, "N-ary phones", and artificial intelligence rules based, in large part, on the work of Arthur Lessac are implemented to improve tonal energy, musicality, natural sounds and structural energy in the inventive computer generated speech. Applications of the present invention include customer service response systems, telephone answering systems, information retrieval, computer reading for the blind or "hands busy" person, education, office assistance, and more.

Current speech synthesis tools are based on signal processing and filtering, with processing based on phonemes, diphones and/or phonetic analysis. Current systems are understandable, but largely have a robotic, mechanical, mushy or nonhuman style to them. In accordance with the invention, speech synthesis is provided by implementing inventive features meant to simulate linguistic characteristics and knowledge-based processing to develop a machine-implementable model simulating human speech by implementing human speech characteristics and a pseudo-natural text to speech model.

There are numerous systems on the market today. While this would seem to validate an existing need for natural sounding text to speech systems, most current text to speech systems are based on old paradigms including pattern recognition and statistical processing, and achieving the less than desirable performance noted above. The same may include so-called "Hidden Markov Models" for identifying system parameters, and determining signal processing.

Figure 1:
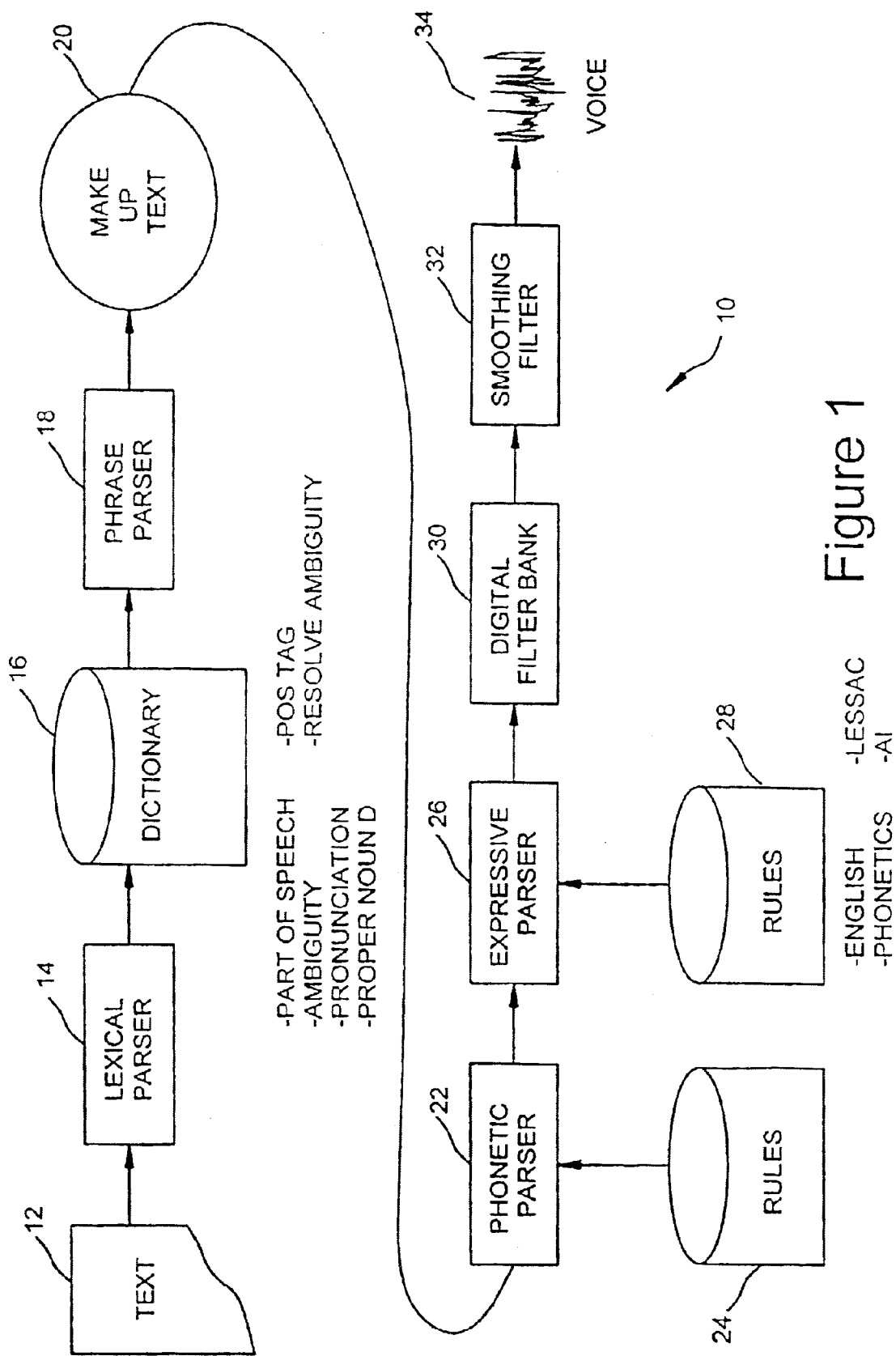
FIG. 1 illustrates a text to speech system in accordance with the present invention.

Referring to FIG. 1, the inventive system 10 begins processing with a file or record of text 12. Lexical parsing is then implemented at step 14. The first task is referred to below as tokenization. In accordance with the invention, tokenization is used to extract a word and punctuation list in sequential order from the text. The result is a word list and this word list is then processed using dictionary information at step 16. Processing includes looking up for each word: possible parts of speech which it may constitute, depending upon context, possible ambiguity, and possible word combinations in various idiomatic phrases, which are all contained in the dictionary consulted by the system at step 16. Following dictionary look up at step 16, a phrase parser identifies the end of each phrase at step 18, removes lexical ambiguity and labels each word with its actual part of speech. Tokenization is completed with the generation of marked up text at step 20.

The process of tokenization constitutes producing a word list for input text in a file or record being transformed into speech in accordance with the present invention. For example, in the question: "Mr. Smith, are you going to New York on June 5?", the output of the first part of the tokenizing operation appears as:

Mr., Smith, [comma], are, you, going, to, New, York, on, June, 5, [?]

After dictionary lookup at step 16 (as described in greater detail below), this same expression is represented as:

Mister Smith, [comma], are, you, going, to, New York, on, June fifth, [?]

It is noted that the proper name "Mister Smith" is grouped as a single token even though it has more than one word. The same is true of "June 5" which is a date. The "?" is included as a token because it has special implications about prosody, including pitch and tonal expression, to be accounted for later in the text to speech processing.

In accordance with the invention, each word is then decomposed by a phonetic parser at step 22 into phonemes, di-phones or "M-ary" phonemes, as appropriate based on rules contained within a database, containing English language and English phonetics rules. The output of this database is provided at step 24.

In addition to the application of rules at step 24, the system also implements an expressive parser at step 26. Expressive parsing is done at step 26 with the aid of rules processing based on Lessac voice coaching system theory which are obtained from a database at step 28. In particular, the system identifies such things as consonant "drumbeats", whether or not they are voiced, tonal energy locations in the word list, structural "vowel" sounds within the words, and various "connectives". Other pragmatic pattern matching rules are applied to determine such things as speaker identity, emotion, emphasis, speed, pitch, and the like as will be discussed in detail below. The resulting "phoneme" list is passed into a digital filter bank where the audio stream for a given phoneme is looked up in a database, filtered using digital filters, at step 30, whose parameters are determined by the previous rule processing, and finally "smoothed" prior to outputting the audio to the speakers. For the smoothing may be achieved through the use of a smoothing filter at step 32 which, at step 34, outputs a voice signal.

In accordance with the invention, a dictionary is used on an interactive basis by the system. The contents of any existing dictionary, such as the American Heritage Dictionary, may be employed and stored in the system in any suitable form, such as the hard drive, RAM, or combinations of the same. Such a dictionary database is consulted by the system during operation of the text to speech engine. The dictionary databases applications, should contain information on spelling, part of speech, and pronunciation as well as a commonly occurring proper name list, geographical name list and the like. It further must represent ambiguous parts of speech. Other items which are required include common idioms and full spellings for abbreviations or numerical tokens, as well as other information in the form of algorithms for determining such things as speaker identity, paragraph and page numeration, and the like which one may not desire to turn into speech in every instance.

Thus, dictionary lookup will do such things as recognize "John Smith" to a single token rather than two separate words for grammatical purposes. Nevertheless, the system will treat the same as two words for speech purposes. Likewise, "Jun. 5, 2001" must be treated as a single date token for grammatical purposes, but represented as "June fifth, two thousand and one" for speech purposes. This will take a special date algorithm. "Run" is a single word with multiple meanings. Thus, it is necessary for the dictionary to list for each word, all the possible parts of speech of which that word may take the form. "Dr." must be represented as "doctor" for future speech processing. "Antarctica" must carry the dictionary pronunciation. However, in addition to such things as the above, the quality of the output, in accordance with the invention, involves the inclusion of Lessac consonant energy rules processing and other Lessac rules, as will be described in detail below. Generally the inventive approach is to treat each consonant energy sound as a "time domain Dirac delta function" spread by a functional factor related to the specific consonant sound.

A phrase parser is a rule production system or finite state automated processor that uses part of speech as a word matching criteria. The output is a phrase labeled with roles of word whose function in the sentence has been identified (such as subject of verb v, verb, object, object of prepositional phrase modifying x, adjective modifying noun y). A prior art phrase parser may be employed in accordance with the invention, modified to implement the various criteria defined herein. In accordance with the invention, a simple phrase parser may be used to identify the phrase boundaries and the head and modifier words of each phrase. This is useful in determining appropriate pauses in natural speech.

Many speech synthesis systems use a phonetic parser that breaks a word into its component spoken sounds. The inventive speech synthesis system also uses a phonetic parser, but the output of the phonetic parser is used to implement the Lessac rules, as described below.

In accordance with the preferred embodiment of the invention, this will be accomplished by generating three tokens for each word. The tokens are sent to the Lessac rules processor, as described below. The first is the English word. Normally this is taken directly from the text, but sometimes it must be generated. Examples above showed how "doctor" must replace "Dr." and "fifth" must replace the number "5" in a date expression. The second token is the English dictionary provided phonetic description of the word. This is used as a matter of convenience and reference for future processing and filtering. The third token to be output to the Lessac rules processor is the output of a standard phonetic parser. For example, the word "voice" may provide sounds corresponding sequentially to the alphabetical representations [V], [OI] and [S].

In accordance with a preferred embodiment of the invention, Lessac rule processing is a core component, where the work of Arthur Lessac is implemented in the processing. Lessac rules scan the marked up text and choose a particular audio frame or audio transition frame for spoken expression. Lessac rules may also identify pitch, speed or potency (volume). A few examples are given below. A full compilation of Lessac rules are found in the literature. Particular reference is made to Arthur Lessac's book, The Use and Training of the Human Voice, published by Drama Book Publishers in 1967. Lessac rules operate on the tokens provided to them by the phonetic parser.

In accordance with Lessac theory, consonant energy is associated conceptually with the symphony orchestra. In particular, in the Lessac "orchestra" musical instruments are associated with consonant sounds. The Lessac rules for consonant energy identify one or more musical instrument audio characteristics with each consonant portion of each word. The rules in Lessac theory correspond largely to the markings in his text and the selection of the sound (i.e. the "z bass fiddle"). For example, in the phrase "His home was wrecked", the Lessac consonant energy rules would identify the first and second 's' as a "z bass fiddle", the 'm' as a "m viola" and the 'ck' followed by 'd' as a "KT double drumbeat". In other situations, "n" is a violin. Each of these instruments associated sounds, in turn, will have stored audio signals ripe for subsequent filtering processing.

Classical Lessac teaching relies upon the building of a mental awareness of music as an essential component of speech and introducing this into the consciousness of the student while he is speaking, resulting in the student articulating a mode of speech informed by the desired and associated Lessac musicality objectives.

Lessac implementation in accordance with the present invention takes the form of both including in the database of sounds for playback sounds which have well-defined Lessac implementations (i.e. follow the rules prescribed by Arthur Lessac to obtain proper intelligible pronunciation), and takes the form of selecting particular sounds depending upon the sequence of phonemes identified in word syllables found in the input text, which is to be transformed into speech.

In accordance with Lessac theory, the student is taught the concept of tonal energy by being shown how to experience the sensation of vocal vibrations.

In accordance with the invention, it is believed that when the voice is properly used, the tones are consciously transmitted through the hard palate, the nasal bone, the sinuses and the forehead. These tones are transmitted through bone conduction. There are certain sounds which produce more sensation than others. For example, consider the sound of the long "e"y as in "it's ea sy". This "Y Buzz" can be stored as an auditory hum "e"-y "ea-sy."

In accordance with the invention, it is believed that when the voice is properly used, the tones are consciously transmitted through the hard palate, the nasal bone, the sinuses and the forehead. These tones are transmitted through bone conduction. There are certain sounds which produce more sensation than others. For example, consider the sound of the long "e"y as in "it's ea sy". This "Y Buzz" can be stored as an auditory hum which can be used as an audio pattern for voice synthesis. The sound of the second "a" in "away" is also considered a concentrated tone, known as a "+Y Buzz" in accordance with Lessac theory. Other sounds are concentrated vowels and diphthongs, such as the long "o" as in "low". Open sounds using a "yawn stretch" facial posture create bone conducted tones coursing through the bony structures, allowing the voice to become rich, dynamic, and full of tonal color, rather than tinny, nasal and strident. In a "yawn stretch" the face assumes a forward facial posture. This forward facial posture can be better understood if one pictures a reversed megaphone, starting as an opening at the lips and extending with greater and greater size in the interior of the mouth. One would commonly make this sound if one said the word "Oh" with surprise.

Structural energy has been described by Lessac through the use of a numbering system, utilizing an arbitrary scale of 1 to 6, corresponding to the separation between lips during spoken language, and in particular the pronunciation of vowels and diphthongs. The largest lip opening is a 6 for words like "bad" and the smallest is a 1 for words like "booze". Table 1 briefly illustrates the numbering system, which is described in great detail in Lessac's works. In accordance with the invention, the Lessac rules are used to quantify each major vowel sound and use the same to activate stored audio signals.

TABLE 1

| #1 | #2 | #3 | #4 | #5 | #5.5 | #6 |
|---|---|---|---|---|---|---|
| Ooze | Ode | All | Odd | Alms | Ounce | Add |
| Boon | Bone | Born | Bond | Bard | Bound | Banned |
| Booed | Abode | Bawdy | Body | Barn | Bowed | Bad |

Lessac identifies a number of the ways that words in spoken language are linked, for example the Lessac "direct link". On the other hand, if there are two adjacent consonants, made in different places in the mouth, such as a "k" followed by a "t", the "k" would be fully 'played', meaning completed before moving on to the "t". This is known as "play and link". A third designation would be when there are two adjacent consonants made in the same place in the mouth—or in very close proximity—such as a "b" followed by another "b" or "p" as in the case of "grab boxes" or "keep back". In this case, the first consonant, or 'drumbeat" would be prepared, meaning not completed, before moving on the second drumbeat, so there would simply be a slight hesitation before moving on to the second consonant. This is called 'prepare and link". In accordance with the invention, rules for these situations and other links that Lessac identifies are detailed in his book "The Training of the Human Voice".

The operation of the invention may be understood, for example, from the word "voice". The word "voice" receives three tokens from the phonetic parser. These may be: [voice], [V OI S], and [vois].

The Lessac rules processor then outputs the sequence of sounds in Lessac rule syntax as follows for "voice":

V-Cello, 3-Y Buzz, S (unvoiced)

According to the invention, incorporation of "pragmatic" rules is used to enable the achievement of more realistic spoken voice in a text to speech system. Pragmatic rules encapsulate contextual and setting information that can be expressed by modification of voice filtering parameters. Examples of pragmatic rules are rules which look to such features in text as the identity of the speaker, the setting the part of speech of a word and the nature of the text.

For example, of the inventive system may be told, or using artificial intelligence may attempt to determine, whether the speaker is male or female. The background may be made quiet or noisy, and a particular background sound selected to achieve a desired effect. For example, white noise may lend an air of realism. If the text relates to the sea, artificial intelligence may be used to determine this based on the contents of the text and introduce the sound of waves crashing on a boulder-strewn seashore. Artificial intelligence can also be used in accordance with a present invention to determine whether the text indicates that the speaker is slow and methodical, or rapid. A variety of rules, implemented by artificial intelligence where appropriate, or menu choices along these lines, are made available as system parameters in accordance with a preferred embodiment of the invention.

In accordance with the invention, punctuation and phrase boundaries are determined. Certain inflection, pauses, or accenting can be inferred from the phrase boundaries and punctuation marks that have been identified by known natural language processing modules. These pragmatic rules match the specific voice feature with the marked up linguistic feature from prior processing. Examples may be to add pauses after commas, longer pauses after terminal sentence punctuation, pitch increases before question marks and on the first word of sentences ending with a question mark, etc. In some cases, an identified part of speech may have an impact on a spoken expression, particularly the pitch associated with the word.

Artificial intelligence may also be used, for example, in narrative text to identify situations where there are two speakers in conversation. This may be used to signal the system to change the speaker parameters each time the speaker changes.

As alluded to above, in accordance with the invention, stored audio signals are accessed for further processing based on the application of Lessac rules or other linguistic rules. At this point in the speech processing, a stored database or "dictionary" of stored phonemes, diphones and M-ary phonemes is used to begin the audio signal processing and filtering. Unlike prior systems that tend to exclusively use phonemes, or diphones, the inventive system stores phonemes, diphones, and M-ary phonemes all together, choosing one of these for each sound based on the outcome of the Lessac and linguistic rules processing.

For example, structural energy symbols from Lessac's book, as published in 1967 (second edition) at pages 71 correspond to some of these sounds, and are identified as structural energy sounds #1, #21, #3, #4, #5, #51, and #6. On page 170–171 of the new third edition of the text, published in 1997, ague more symbols/sounds are headed to complete the group: 3y, 6y and the R-derivative sound. These correspond to the shape of the mouth and lips and may be mapped to the sounds as described by Lessac.

In the treatment of Lessac consonant energy sounds, the same can be modeled, in part as time domain Dirac delta functions. In this context, the Dirac function would be spread by a functional factor related to the specific consonant sound and other elements of prosody.

In accordance with the precedent mentioned it is also contemplated that the Lessac concept of body energy is a useful tool for understanding speech and this understanding may be used to perform the text to speech conversion with improved realism. In particular, in accordance with Lessac body energy concepts, it is recognized that certain subjects and events arouse feelings and energies. For example, people get a certain feeling in anticipation of getting together with their families during, for example, the holiday season. Under certain circumstances this will be visibly observable in the gait, movement and swagger of the individual.

From a speech standpoint, two effects of such body energy can be modeled into the inventive system. First of all, the tendency of an individual to speak with a moderately increased pace and that they higher pitch can be introduced into the prosody in response to the use of artificial intelligence to detect the likelihood of body energy. In addition, depending upon the speech environment, such body energy may cause body movements which resulted in variations in speech. For example, an individual is at a party, and there is a high level of Lessac body energy, the individual may move his head from side to side resulting in amplitude and to a lesser extent pitch variations. This can be introduced into the model in the form of random parameters operating within predefined boundaries determined by artificial intelligence. In connection with the invention, it is noted that whenever reference is made to random variations or the introduction of a random factor into a particular element of prosody, the same may always be introduced into the model in the form of random parameters operating within predefined boundaries determined by the system.

Instead of a uniform methodology, this hybrid approach enables the system to pick the one structure that is the information theoretic optimum for each sound. By information theoretic optimum, in accordance with the invention it is believed the sound of minimum entropy using the traditional entropy measurement of information theory [as described by Gallagher] is the information theoretic optimum.

The digital filtering phase of the processing begins with the selection of phonemes, di-phones, M-ary phonemes or other recorded sounds from the audio signal library based on prior processing. Each sound is then properly temporally spaced based upon the text mark up from the above described prior rule processing and then further filtered based on instructions from the prior rule processing.

The following list indicates the types of filters and parameters that may be included. The effectiveness of filtering is a relatively subjective matter. In addition, different filtering systems may react radically differently for different voices. Accordingly, the selection of optimum filtering is best performed through trial and error, although prior art techniques represent a good first cut solution to a speech filtering operation. In accordance with the invention it is believed that a time warp filter may be used to adjust the tempo of speech. A bandpass filter is a good means of adjusting pitch. Frequency translation can be used to change speaker quality, that is to say, a smoothing filter will provide speech continuity. In addition, in accordance with the present invention, it is contemplated that filters may be cascaded to accommodate multiple parameter requirements.

In accordance with a present invention, it is contemplated that the spoken output will be achieved by sending the filtered audio signal directly to a digital audio player. Standard audio signal formats will be used as output, thus reducing costs.

Figure 2:
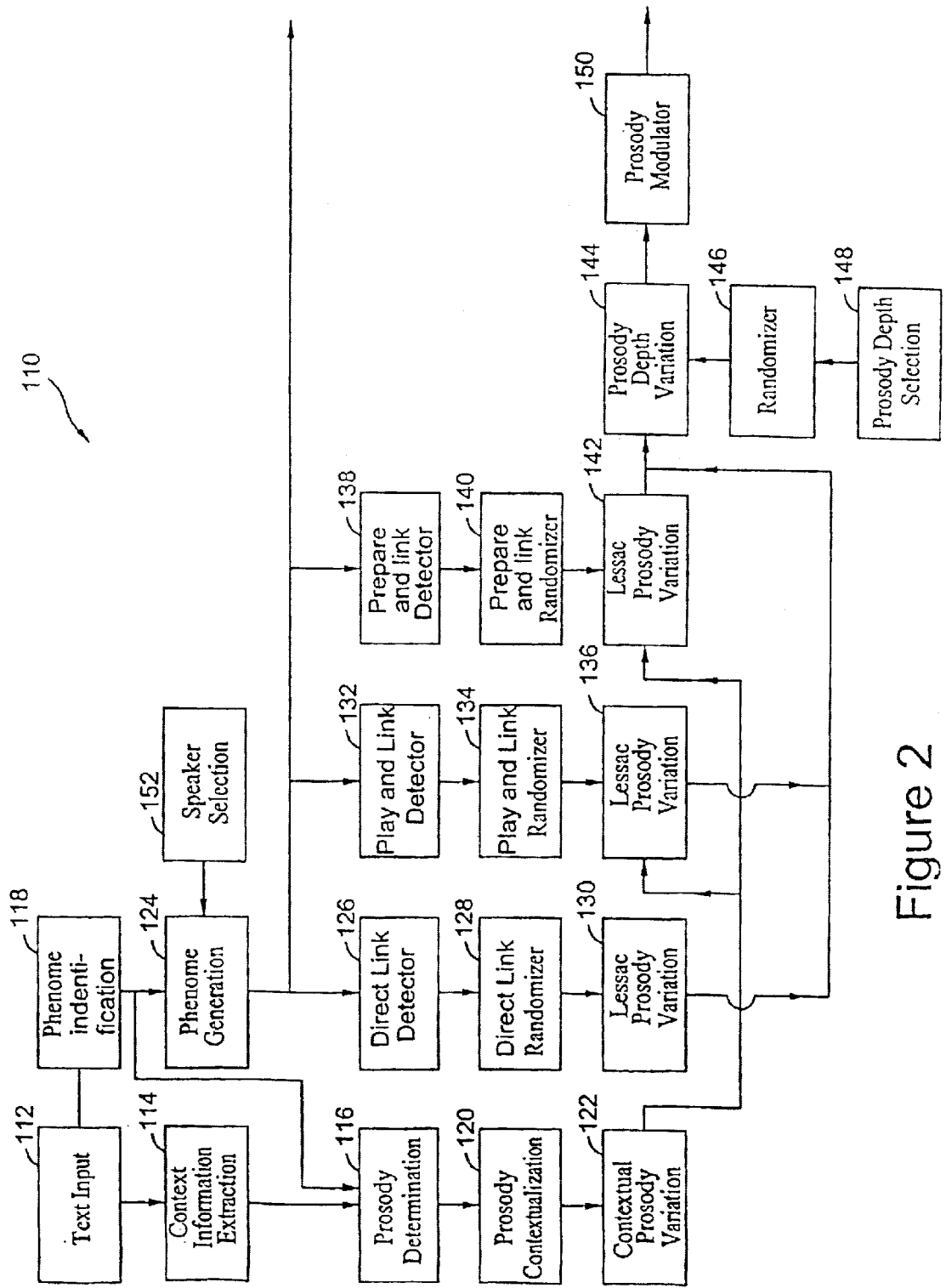
FIG. 2 illustrates a text to speech system implementing three Lessac rules.
Figure 3:
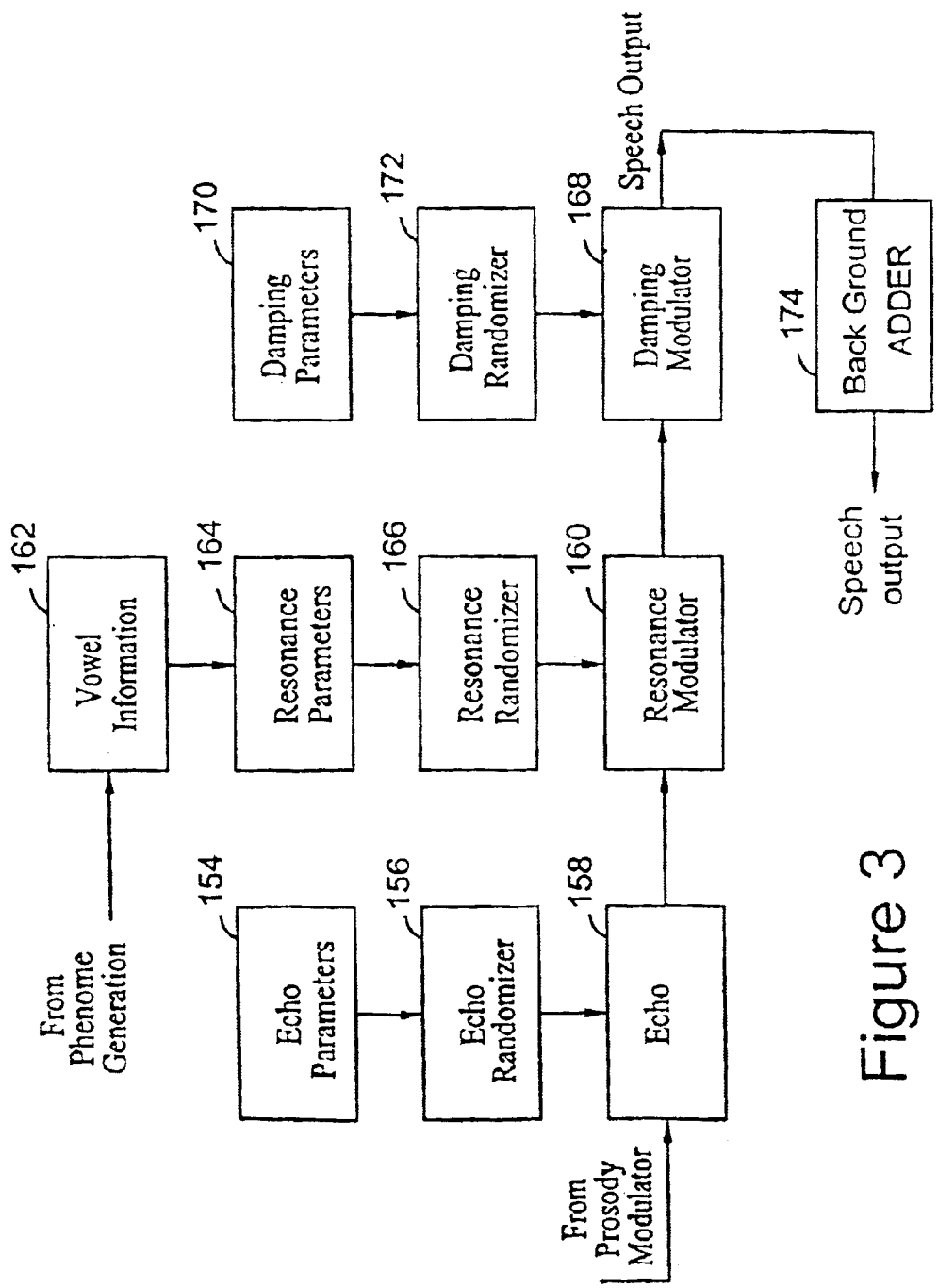
FIG. 3 illustrates a filtering system to be used to process the prosody output from the system of FIG. 2.

Turning to FIGS. 2 and 3, a particularly advantageous embodiment of a text to speech processing method 110 constructed in accordance with the present invention is illustrated. Method 110 starts with the input, at step 112, of text which is to be turned into speech. Text is subjected to artificial intelligence algorithms at step 114 to determine context and general informational content, to the extent that a relatively simple artificial intelligence processing method will generate such informational content. For example, the existence of a question may be determined by the presence of a question mark in the text. This has a particular effect on the prosody of the phonemes which comprise the various sounds represented by the text, as noted above.

At step 116, the prosody of the phonemes in the text, which are derived from the text at step 118, is determined and a prosody record created. The prosody record created at step 116 is based on the particular word as its pronunciation is defined in the dictionary. The text with the context information associated with it is then, at step 120 used to determine the prosody associated with a particular element of the text in the context in the text. This contextual prosody determination (such as that which would be given by a question mark in a sentence), results in additional information which is used to augment the prosody record created at step 118.

In accordance with the invention, the prosody of the elements of text are assigned quantitative values relating to pitch and duration at step 118. The values generated at step 118 are then varied at step 120. Accordingly, step 118 is said to generate an augmented prosody record because it contains base information respecting prosody for each word varied by contextual prosody information.

However, in accordance with the present invention, the mechanical feeling of uniform rules based prosody is eliminated to the use of random variation of the prosody numbers output by the system. Nationally, the range of random variation must be moderate enough so as not to extend quantitative prosody values into the values which would be associated with incorrect prosody. However, even mild variations in prosody are very detectable by the human ear. Consider, for example, the obviousness of even a slightly sour note in a singer's delivery. Thus, without varying prosody so much as to destroy easy understanding of meaning in the output speech signal, prosody may be varied to achieve a nonmechanical output speech signal. Such variation of the quantitative values in the prosody record is implemented at step 122.

Phonemes, which are identified at step 118, must, in addition to identification information output at step 118, be associated with sound information. Such sound information takes the form of standardized sound information. In accordance with the preferred embodiment of the invention, prosody information is used to vary duration and pitch from the standardized sound information. Such sound information for each phoneme is generated at step 124.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energy which defines the various portions of the envelope for each phoneme.

While, in accordance with the embodiment of the invention which will be detailed below, these sounds, or more precisely the rules and associated quantitative values for generating these sounds, may be varied in accordance with Lessac rules, application of Lessac rules may be implemented by storing different forms of each phoneme, depending upon whether the phoneme is the pending portion of an initial phoneme or the beginning portion of a terminal phoneme, and selecting the appropriate form of the phoneme as suggested by the operative Lessac rule, as will be discussed in detailed below.

The sound information for the sequence of phonemes which, in the preferred embodiment takes the form of phoneme identification information and associated pitch, duration, and voice information, is sent to the Lessac direct link detector at step 126.

To understand the concept of the Lessac direct link, Under Lessac theory, after the individual has learned the specific sensations of an individual consonant or consonant blend such as "ts" as in "hits", he/she learns to apply that musical feel or playing to words, then sentences, then whole paragraphs, then extemporaneously in everyday life. There are specific guidelines for the "playing" of consonants in connected speech. The same rules apply within a single word as well. Those rules include, for example: A final consonant can be linked directly to any vowel at the beginning of the next word, as in:
far above (can be thought of as one word, i.e. farabove)
grab it
stop up
bad actor
breathe in
that's enough
this is it This is called direct linking.

When the sequence of two phonemes requires a direct link under Lessac theory, the same is detected at step 126. In accordance with Lessac theory, the quantitative values associated with each of the phonemes are modified to produce the correct sound. Such direct link modification is output by the system at step 126. However, at step 128 the degree of modification, instead of being made exactly the same in every case, is randomized. The objective is natural sounding text to speech rather than mechanical uniformity and faithfulness to input models. Accordingly, at step 128 an additional degree of modification is introduced into the quantitative values associated with the phonemes and the system generates a randomized Lessac-dictated sound in the form of a sound identification and associated quantitative prosody bundled with other parameters.

At step 130, the randomized Lessac-dictated sound in the form of sound identification and associated quantitative prosody bundled with other parameters is then modified live the output prosody record generated at step 122.

Similarly, another pronunciation modification recognized under Lessac theory is the so-called play and link. Back-to-back consonants that are formed at totally different contact points in the mouth can be played fully. For example, black tie, the K (tom-tom) beat is formed by the back of the tongue springing away from the soft palate and the T snare drum beat is formed by the tip of the tongue springing away from the gum ridge-two totally different contact points-so the K can be fully played (or completed) before the T is tapped. The same principle applies to "love knot", where the V cello and the N violin are made in two different places in the mouth. Other examples would be:
sob sister
keep this
stand back
take time
smooth surface
stack pack
can't be
hill country/ask not why
understand patience This type of linking is called play and link.

Thus, when the sequence of two phonemes requires a play and link under Lessac theory, the same is detected at step 132. In accordance with Lessac theory, the quantitative values associated with each of the phonemes are modified to produce the correct sound. Such play and link modification is output by the system at step 132. At step 134 the degree of modification, instead of being made exactly the same in every case, is randomized in order to meet the objective of natural sounding text to speech. Accordingly, at step 134 an additional degree of modification is introduced into the quantitative values associated with the phonemes and the system generates a randomized Lessac-dictated sound in the form of a sound identification and associated quantitative prosody bundled with other parameters.

At step 136, the randomized Lessac-dictated sound in the form of sound identification and associated quantitative prosody bundled with other parameters is then modified by the output prosody record generated at step 122.

Another pronunciation modification recognized under Lessac theory is the so-called prepare and link. Some consonants are formed at the same or nearly the same contact point in the mouth. This is true for identical consonants and cognates. Cognates are two consonants made in the same place and in the same way, one voiced, the other unvoiced. See Table 2.

| Identical | stab back | help pack | |
| Cognates | bribe paid | keep back | sit down |

In these cases, the individual prepares and implodes the first consonant-that is, the lips or tongue actively takes the position for the first consonant—but only fully executes the second one. The preparation keeps the first consonant from being merely dropped.

This prepared action will also take place when the two consonants are semi-related meaning their contact points are made at nearly the same place in the mouth:
stab me
help me
good news
that seems good
red zone
did that Semi-related consonants are only related when they occur as a drumbeat followed by a sustainable type consonant. When they are reversed:
"push down", for instance, the relationship disappears, and
they are simply Play and Link opportunities.

This type of linking is called prepare and link.

The effect of these three linking components is to facilitate effortless flow of one word to another as natural sounding speech. The same effect is produced within a word.

Accordingly, when the sequence of two phonemes requires a prepare and link under Lessac theory, the same is detected at step 138. In accordance with Lessac theory, the quantitative values associated with each of the phonemes are modified to produce the correct sound. Such play and link modification is output by the system at step 138. At step 140 the degree of modification, instead of being made exactly the same in every case, is randomized in order to meet the objective of natural sounding text to speech. Accordingly, at step 140 an additional degree of modification is introduced into the quantitative values associated with the phonemes and the system generates a randomized Lessac-dictated sound in the form of a sound identification and associated quantitative prosody bundled with other parameters.

At step 142, the randomized Lessac-dictated sound in the form of sound identification and associated quantitative prosody bundled with other parameters is then modified by the output prosody record generated at step 122.

As will be understood from the above description of the Lessac rules, proceed variation can only occur at step 130, step 136 or step 142, because a sequence of two phonemes can be subject to only one of the rules in the group consisting of the direct link rule, the play and link rule, and the prepare and link rule.

In accordance with the present invention, the depth of prosody variation may also be varied. This should not be confused with random variations. In particular, random variations within a given range may be applied to quantitative prosody values. However, the range may be changed resulting in greater depth in the variation. Changes in a range of a random prosody variation may take several forms. For example, the variation is a normal or bell-curve distribution, the depth of prosody variation may take the form of varying the quantitative value of the peak of the bell curve, and/or varying the width of the bell curve.

Of course, variation may follow any rule or rules which destroy uniformity, such as random bell curve distribution, other random distributions, pseudo random variation and so forth.

In particular, prosody may be varied at step 144 in response to a random input by the system at step 146. In addition, at step 148 the depth may be subjected to manual overrides and/or manual selection of bell curve center point, bell curve width or the like.

The sound identification information and bundled prosody and other parameters present in the system after the performance of step 144 is then sent to a prosody modulator which generates a speech signal at step 150.

In a manner similar to the prosody depth selection manually input into the system at step 148, the system, in accordance with a present invention also contemplates variation in the phoneme selection to simulate different speakers, such as a male speaker, a female speaker, a mature female speaker, a young male speaker, a mature male speaker with an accent from a foreign language, and so forth. This may be done at step 152.

In accordance with the invention increased realism is given to the system by considering potential aspects of speech in the real world. This may involve a certain amount of echo which is present to a limited extent in almost all environments. Echo parameters are set at step 154. At step 156 these are subjected to a randomization, to simulate for example, a speaker who is moving his head in one direction or another or walking about as he speaks. Echo is then added to the system in accordance with the randomized parameters at step 158.

The signal generated at step 158 is then allowed to resonate in a manner which simulates the varying sizes to vocal cavity consisting of lungs, trachea, throat and mouth. The size of this cavity generally varies in accordance with the vowel in the phoneme. For example, the vowel "i" generally is spoken with a small vocal cavity, while the letter "a" generally is produced with a large vocal cavity.

Resonance is introduced into the system at step 160 where the center frequency for resonance is varied in accordance with vowel information generated at step 162. This vowel information is used to control resonance parameters at step 164. This may be used to affect the desired the Y-buzz and a-Y buzz, for example. In addition, randomization may be introduced at step 166. In connection with the invention, it is generally noted that any step for adding randomization may be eliminated, although some degree of randomization is believed to be effective and desirable in all of the various places where it has been shown in the drawings.

The signal generated at step 160 is then damped in a manner which simulates the dampening effect of the tissues which form the vocal cavity. The damping effect of the tissues of this cavity generally varies in accordance with the frequency of the sound.

Damping is introduced into the system at step 168. Damping parameters are set at step 170 and may optionally be subjected to randomization at step 172 where final damping information is provided. This damping information is used to control damping implemented at step 168.

Finally, at step 174, background noise may be added to the speech output by the system. Such background noise may be white noise, music, other speech at much lower amplitude levels, and so forth.

Accordance with the present invention, it is contemplated that artificial intelligence will be used to determine when pauses in speech are appropriate. These bosses may be increased, when necessary and in the bosses used to make decisions respecting the text to speech operation. In addition, smoothing filters may be employed between speech breaks identified by consonant energy drumbeats, as this term is defined by Lessac. These drumbeats demark segments of continuous speech. The use of smoothing filters will make the speech within these segments sound continuous and not blocky per existing methods.

In addition, more conventional filtering, such as attenuation of bass, treble and midrange audio frequencies may be used to affect the overall pitch of the output speech in much the same manner as a conventional stereo receiver used for entertainment purposes.

Figure 4:
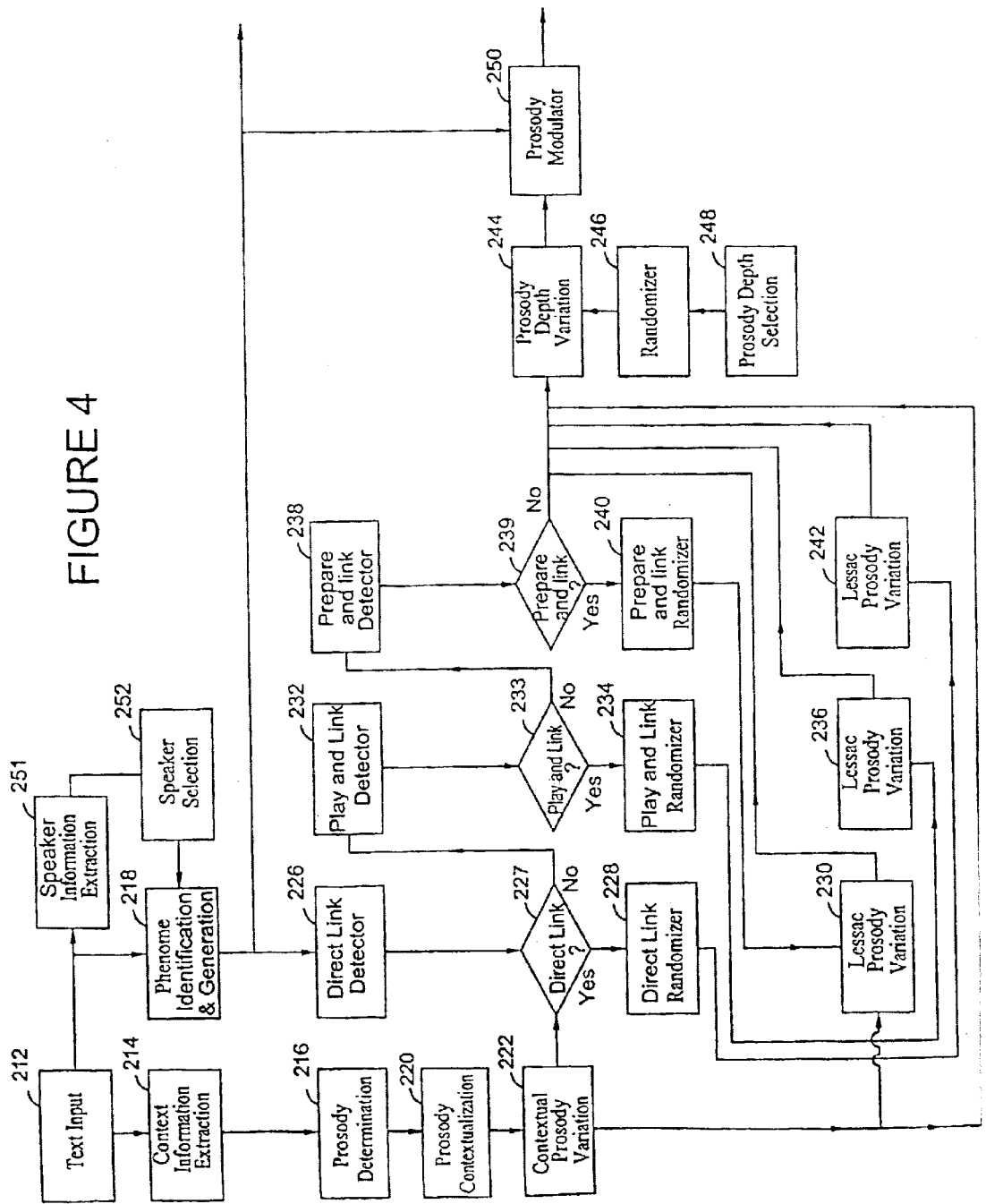
FIG. 4 illustrates a text to speech system similar to that illustrated FIG. 2 with the added feature of speaker differentiation.

Turning to FIG. 4, an alternative embodiment of a text to speech processing method 210 constructed in accordance with the present invention is illustrated. Method 210 starts with the input, at step 212, of text which is to be turned into speech. Text is subjected to artificial intelligence algorithms at step 214 to determine context and general informational content, to the extent that a relatively simple artificial intelligence processing method will generate such informational content. For example, the existence of a question may be determined by the presence of a question mark in the text. This has a particular effect on the prosody of the phonemes which comprise the various sounds represented by the text, as noted above.

At step 216, the prosody of the phonemes in the text, which are derived, together with an identification of the phonemes and the sound of the phonemes, from the text at step 218, is determined and a prosody record created. The prosody record created at step 216 is based on the particular word as its pronunciation is defined in the dictionary. The text with the context information associated with it is then, at step 220 used to determine the prosody associated with a particular element of the text in the context in the text. This contextual prosody determination (such as that which would be given by a question mark in a sentence), results in additional information which is used to augment the prosody record created at step 218.

In accordance with the invention, the prosody of the elements of text are assigned quantitative values relating to pitch and duration at step 218. The values generated at step 218 are then varied at step 220. Accordingly, step 218 is said to generate an augmented prosody record because it contains base information respecting prosody for each word varied by contextual prosody information.

However, as in the previous embodiment, the mechanical feeling of uniform rules based prosody is eliminated to the use of random variation of the prosody numbers output by the system. The range of random variation must be moderate enough so as not to extend quantitative prosody values into the values which would be associated with incorrect prosody. In accordance with the invention, prosody is varied so as not to destroy easy understanding of meaning in the output speech signal, while still achieving a nonmechanical output speech signal. Such variation of the quantitative values in the prosody record is implemented at step 222.

Phonemes, which are identified at step 218, must, in addition to identification information output at step 218, be associated with sound information. Such sound information takes the form of standardized sound information. In accordance with the preferred embodiment of the invention, prosody information is used to vary duration and pitch from the standardized sound information. Such sound information for each phoneme is generated at step 218.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energies which define the various portions of the envelope for each phoneme.

The sound information for the sequence of phonemes which, in the preferred embodiment takes the form of phoneme identification information and associated pitch, duration, and voice information, is sent to the Lessac direct link detector at step 226.

When the sequence of two phonemes requires a direct link under Lessac theory, the same is detected at step 226. If a direct link is detected, the system proceeds at decision step 227 to step 228. In accordance with Lessac theory, the quantitative values associated with each of the phonemes are modified to produce the correct sound. Such direct link modification (or a different source phoneme modified by the above prosody variations) is output by the system at step 228. However, at step 228 the degree of modification, instead of being made exactly the same in every case, is randomized. The objective is natural sounding text to speech rather than mechanical uniformity and faithfulness to input models. Accordingly, at step 228 an additional degree of modification is introduced into the quantitative values associated with the phonemes and the system generates a randomized Lessac-dictated sound in the form of a sound identification and associated quantitative prosody bundled with other parameters.

At step 230, the randomized Lessac-dictated sound in the form of sound identification and associated quantitative prosody bundled with other parameters then modifies the output prosody record generated at step 222 and the modified record sent for optional prosody depth modulation at step 244.

If a direct link is not detected at step 226, the system proceeds at step 227 to step 232.

When the sequence of two phonemes requires a play and link under Lessac theory, the same is detected at step 232. If a play and link is detected, the system proceeds at decision step 233 to step 234. In accordance with Lessac theory, the quantitative values associated with each of the phonemes are modified to produce the correct sound. Such play and link modification (or a different source phoneme modified by the above prosody variations) is output by the system at step 232. At step 234 the degree of modification, instead of being made exactly the same in every case, is randomized in order to meet the objective of natural sounding text to speech.

Accordingly, at step 234 an additional degree of modification is introduced into the quantitative values associated with the phonemes and the system generates a randomized Lessac-dictated sound in the form of a sound identification and associated quantitative prosody bundled with other parameters.

At step 236, the randomized Lessac-dictated sound in the form of sound identification and associated quantitative prosody bundled with other parameters then modifies the output prosody record generated at step 222 and the modified record sent for optional prosody depth modulation at step 244.

If a play and link is not detected at step 232, the system proceeds at step 233 to step 238. Accordingly, when the sequence of two phonemes requires a prepare and link under Lessac theory, the same is detected at step 238. If a prepare and link is detected, the system proceeds at decision step 239 to step 246. In accordance with Lessac theory, the quantitative values associated with each of the phonemes are modified to produce the correct sound. Such play and link modification (or a different source phoneme modified by the above prosody variations) is output by the system at step 240. At step 240 the degree of modification, instead of being made exactly the same in every case, is randomized in order to meet the objective of natural sounding text to speech. Accordingly, at step 240 an additional degree of modification is introduced into the quantitative values associated with the phonemes and the system generates a randomized Lessac-dictated sound in the form of a sound identification and associated quantitative prosody bundled with other parameters.

At step 242, the randomized Lessac-dictated sound in the form of sound identification and associated quantitative prosody bundled with other parameters then modifies the output prosody record generated at step 222 and the modified record sent for optional prosody depth modulation at step 244.

If a prepare and link is not detected at step 238, the system proceeds at step 239 to step 244, where the prosody record and the phoneme, without Lessac modification are subjected to prosody depth variation.

In accordance with the present invention, prosody may be varied at step 244 in response to a random input by the system at step 246. In addition, at step 248 the depth may be subjected to manual overrides and/or manual selection of bell curve center point, bell curve width or the like.

The sound identification information and bundled prosody and other parameters present in the system after the performance of step 244 is then sent to a prosody modulator which generates a speech signal at step 250.

In a manner similar to the prosody depth selection manually input into the system at step 248, the system, in accordance with a present invention also contemplates variation in the phoneme selection to simulate different speakers, such as a male speaker, a female speaker, a mature female speaker, a young male speaker, a mature male speaker with an accent from a foreign language, and so forth. In accordance with the invention, it is contemplated that artificial intelligence or user inputs or combinations of the same may be used to determine the existence of dialogue. Because generally dialogue is between two speakers, and where this is the case, the system, by looking, for example, at quotation marks in a novel, can determine when one speaker is speaking and when the other speaker is speaking. Artificial intelligence may determine the sex of the speaker, for example by looking at the name of the speaker in the text looking at large portions of text to determine when a person is referred to sometimes by a family name and at other times by a full name. All this information can be extracted at step 251 and used to influence speaker selection at step 252. For example, the machine may make one of the speaker's speaking in a deep male voice, while the other speaker will speak in a melodious female voice.

Output text at step 250 may then be subjected to further processing as shown in FIG. 3.

Figure 5:
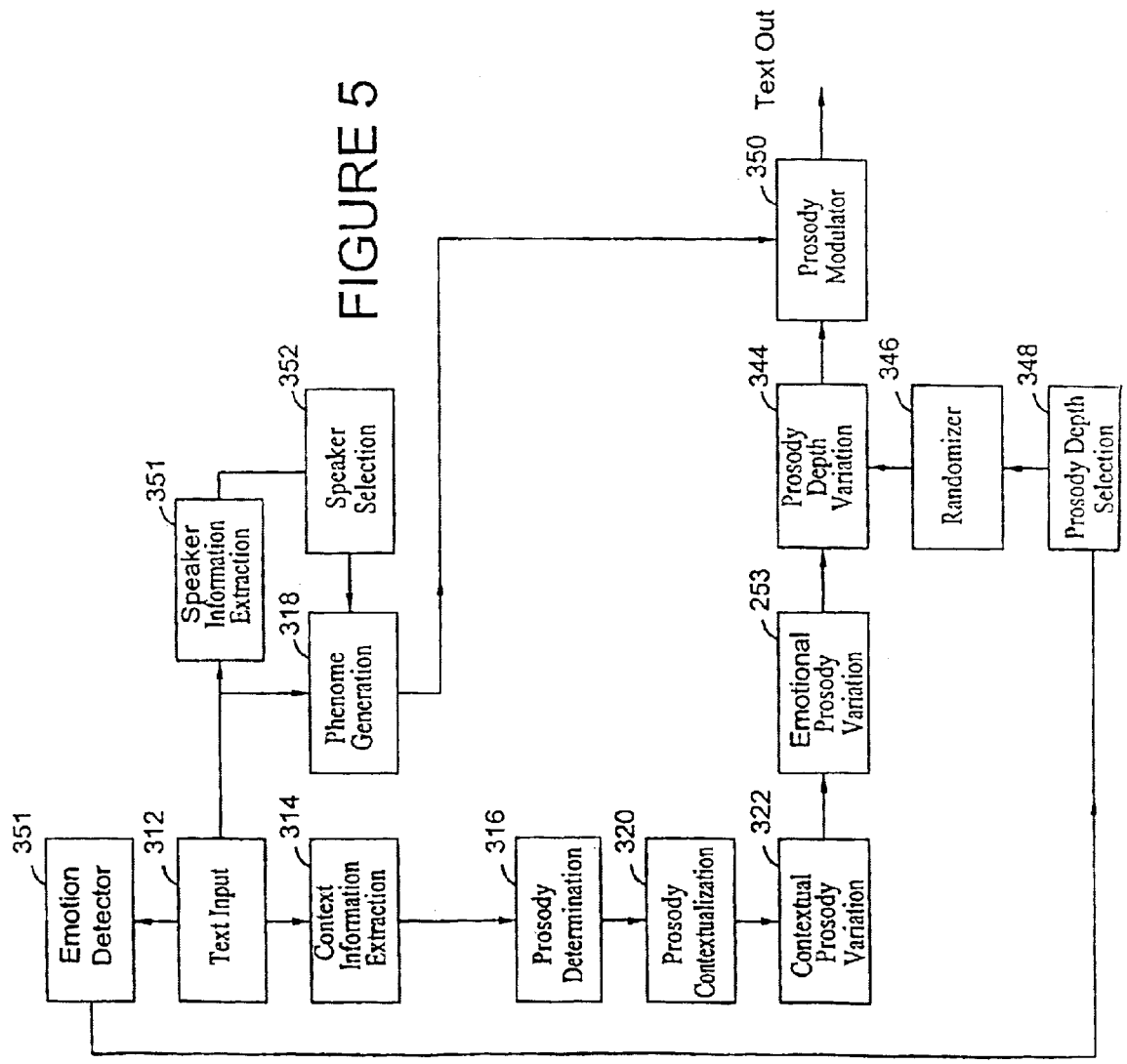
FIG. 5 illustrates a text to speech system in accordance with the invention for implementing emotion in output synthetic speech.

Turning to FIG. 5, an alternative embodiment of a text to speech processing method 310 constructed in accordance with the present invention is illustrated. Method 310 starts with the input, at step 312, of text which is to be turned into speech. Text is subjected to artificial intelligence algorithms at step 314 to determine context and general informational content, to the extent that a relatively simple artificial intelligence processing method will generate such informational content. This has a particular effect on the prosody of the phonemes which comprise the various sounds represented by the text, as noted above.

At step 316, the prosody of the phonemes in the text, which phonemes are derived, together with an identification of the phonemes and the sound of the phonemes, from the text at step 318, is determined and a prosody record created. The prosody record created at step 316 is based on the particular word as its pronunciation is defined in the dictionary. The text with the context information associated with it is then, at step 320 used to determine the prosody associated with a particular element of the text in the context in the text. This contextual prosody determination (such as that which would be given by a question mark in a sentence or a Lessac rule(implemented as in FIG. 4, for example)), results in additional information which is used to augment the prosody record created at step 318.

In accordance with the invention, the prosody of the elements of text are assigned quantitative values relating to pitch and duration at step 318. The values generated at step 318 are then varied at step 320. Accordingly, step 318 is said to generate an augmented prosody record because it contains base information respecting prosody for each word varied by contextual prosody information.

However, as in the previous embodiment, the mechanical feeling of uniform rules based prosody is eliminated to the use of random variation of the quantitative prosody values output by the system. The range of random variation must be moderate enough so as not to extend quantitative prosody values into the values which would be associated with incorrect prosody. In accordance with the invention, prosody is varied so as not to destroy easy understanding of meaning in the output speech signal, while still achieving a nonmechanical output speech signal. Such variation of the quantitative values in the prosody record is implemented at step 322.

Phonemes, which are identified at step 318, must, in addition to identification information output at step 318, be associated with sound information. Such sound information takes the form of standardized sound information. In accordance with the preferred embodiment of the invention, prosody information is used to vary duration and pitch from the standardized sound information. Such sound information for each phoneme is generated at step 318.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energies which define the various portions of the envelope for each phoneme.

The sound information for the sequence of phonemes which, in the preferred embodiment takes the form of phoneme identification information and associated pitch, duration, and voice information, optionally modified by Lessac link detection, as described above, is subjected to optional prosody depth modulation at step 344.

In accordance with the present invention, prosody may be varied at step 344 in response to a random input by the system at step 346. In addition, at step 348 the depth may be subjected to manual overrides and/or manual selection of bell curve center point, bell curve width or the like.

The sound identification information and bundled prosody and other parameters present in the system after the performance of step 344 is then sent to a prosody modulator which generates a speech signal at step 350.

In a manner similar to the prosody depth selection manually input into the system at step 348, the system, in accordance with a present invention also contemplates variation in the phoneme selection and/or quantitative prosody values to simulate emotion. This is achieved through the detection of the presence and frequency of certain words associated with various emotions, the presence of certain phrases and the like. In accordance with the invention, it is contemplated that artificial intelligence (or user inputs or combinations of the same to provide manual overrides) may be used to improve performance in this respect. All this information can be extracted at step 351 and used to generate prosody modification information that further modifies the augmented prosody record at step 253 to reflect the appropriate emotion, which is sent for prosody depth variation at step 344.

Output text at step 250 may then be subjected to further processing as shown in FIG. 3.

New Grapheme to Phoneme Databases for Speech Synthesis Overview

In prior art text-to-speech ("TTS") systems, the underlying synthesizer has been a problem. On the one hand, the use of concatenated approaches, while less flexible than formant approaches, has yielded vocalized identities that sound more consistently male and female. It has also allowed a higher quality of synthesized speech to be played as the harmonics and amplifications that occur in the use of the human voice are captured as high-fidelity recordings and the phonemes used to develop the sounds coming from the synthesizer. Unfortunately, it also greatly affected by inappropriate matching of acoustic units [phonemes, diphones, triphones, etc.], referred to as coarticulations that yield spectral or prosodic discontinuities.

Other difficulties in the prior art are limited and or inappropriate expressiveness, unnatural prosodies, and, where emotional states are called for by the speech to be produced, the played to communicate emotion with the speech.

The inventive system addresses these difficulties. The inventive approach, as set forth above, applies artificial intelligence ("AI") to the recognition of the meaning of the text and identifies the emotional state of the message to be communicated. In accordance with an alternative embodiment of the invention, the grapheme to phoneme database involved in instructing the synthesizer how to pronounce is addressed.

In prior art TTS, input text is analyzed to normalize text, identify the structure of the document, and perform a linguistic analysis of sentence structure, phrasing, etc. This yields an output of text with graphemes. Next a phonetic analysis translates graphemes to phonemes and then prosodic analysis yields phonemic modifications for pitch, duration, and rhythm. The output is the synthesized pronunciation of the input text as processed.

In TTS the the present bottleneck issues have been to arrive at synthesized pronunciations that sound like real people, with rhythm and expressiveness. The gold standard is that of Turing's challenge to have a computer flawlessly imitate human performance on a given speech or language task. As yet the state of the art for TTS systems are far short of meeting the challenge.

An ultimate test would be to apply the Turing challenge to interactive automated speech recognition that responds to speaker independent queries as received and which then affirms its understanding of the query to the speaker and then searches for a meaningful response that is then returned via synthesized speech or other output indicated as a preference by the person initiating the request.

In the inventive method, linguistically marked-up text to be synthesized is further analyzed by automated computational linguistics to apply rules for structural, tonal, and consonant rules used to identify where graphemes and phonemes are placed in sequence for proper pronunciation, and where alternative graphemes and phonemes are used because of the pronunciation changes for words when uttered in a particular sequence of words. Such rules include the link and play, prepare and link, and other rules, as noted in voice texts written by Arthur Lessac.

Artificial Intellgence programs then analyze the original text, linguistically marked-up, to indicate the likely listener and the expressive requirements for the text to be communicated by synthesized speech. This indicates the prosodies involving tone changes, rhythms, timing, and structure, that are used to provide a subsequent modification of the graphemes and phonemes.

One starting point for the inventive method is the use of multiple databases. The contents and generation of These databases as described below. These databases are normalized and serve as reference standards to identify natural speech. Sequences of phonemes of words properly pronounced for clarity and natural articulation of consonant rules for words spoken individually, as well as for words in a sequence of words, have been normalized.

The phonemes and graphemes for these multiple databases, by being normalized, have an attenuated range of inherent rhythms of pronunciation. Similarly, the natural music of tonal variation when playing consonants and vowels have been constrained, and the variation in the uses of structure, which have to do with amplitude and resonance have been similarly reduced.

In the inventive method, additional rules, including those found in the Lessac System of voice use and training, are used as mark-up instructions for modifying a played consonant or vowel tone—extend, shorten, change up and/or down, and the time and rate of change. Similarly, other mark-up instructions for structural changes as they affect the tone, resonance, and harmonics—inverted cone size, lip opening, y-buzz, etc. Lastly, the articulation of consonants, silences, and the randomness of silences, as punctuational elements in prosodies are specified.

The inventive method uses certified Lessac practitioners as speakers pronouncing text in selected styles of expressive communication. These same practitioners examine the text to be spoken to a designated audience for a specific communications purpose. To take but one example, news scripts for radio broadcasts to various audiences of listeners. These would be analyzed for language level, so that a sampling of texts with linguistic comprehension requirement levels representing 8th and 12th grades, as well as an undergraduate college degree are all represented.

Certified Lessac Practitioners then mark-up those texts according to the Lessac System pronunciation rules notations. The same practitioners then speak those examples of text expressively and according to the meaning of the text to be conveyed. Repetitions by each speaker, using alternative pronunciations of the selected style of expression where each of the tonal, structural, and consonant energies, have a different balance in the speech, are also spoken.

These same practitioners listen to each performance, with the exception of their own performance, and note whether the spoken performance accurately followed the text as marked-up. They also evaluate the performance according to whether it fulfills the style criteria while expressing the meaning of the text to be conveyed. Performances that fail, either in terms of accuracy of following the marked-up text or in fulfilling the style criteria, are removed from the collection of performances for the selected text.

The rules applied in marking up the text for a single style of presentation are calibrated for the resulting departure from the normalized values of the same text using the acoustic profiles of the multiple databases. The metrics are output as changes, +/− basic units of measure, to sound generated at the phoneme level in terms of pitch frequencies, sustained time of phoneme, tonal change per unit of time, and the profile of tonal change as followed. Thus, one has an output from the artificial intelligence assessment of the text that suggests the style that is appropriate to the content of the message to be conveyed and which, in turn is used to drive the acoustic profile of rhythm, tone change, and extended or foreshortened articulation of consonants and vowels for the words in the text to be synthesized. They expressive style instructions are measured as measured departures from normalized sound data of individually pronounced words and words that require variations in pronunciation because of the word's position in a sequence of words uttered.

It is an object of the present intention to correlate effective message styles with audience needs. The resulting collection of accepted performances are saved in their high fidelity recorded form and stored as the acoustic database of expressive performances for the selected text. These performances are played to audiences of listeners having educational achievement levels of less than a high school diploma; a high school diploma only; and, those who have an undergraduate college degree. The audiences judge the high-fidelity performances according to perception of the speaker as clearly understandable; listeners' feelings about the speaker—positive, neutral, negative; authenticity of the speaker—genuine—incredible; style of delivery [objective report, factual advocacy, faith-based advocacy, intimate, humorous, etc.]; and the emotional state of the speaker [happy, sad, fearful, angry, etc.]. Listeners are also tested as to whether they accurately perceive the communicated words and phrases (percent of sampled words and phrases tested); and correctly understood the meaning of the intended communication (percent of listeners correctly identifying the main idea of the message; and percent correctly identifying the reasons for the performance and the intended listener)

Simultaneously, a matching set of audiences is assembled, again representing different levels of educational achievement. In this set of audiences, each person visually reads the original text but does not listen to the high-fidelity recordings. The persons are tested for the same items of perceptions, feelings, and correct understanding, as were the members of the listening audiences.

In accordance with the invention, a rules set is constructed to be applied directly from artificial intelligence. When a sufficient sample size in terms of the number of listeners have heard a particular recorded presentation of pronounced text and style and have correctly received the message and understood its meaning, the final rule selection occurs. Treating each rule as an independent variable, a multiple-discriminant statistical analysis is performed to identify the smallest set of rules having a range of variations in metrics from the normalized words and phrases in the multiple databases, that are associated with a percentage, such as 95%, of the modified the phonemes and metrics applied. This removes rules to which understanding are relatively insensitive.

The associated metrics and rules that drive them are accessed by the AI processing and indicate the automated output for modifying the phonemes and graphemes to yield the intended expressiveness, prosodies employed and music elements that support same. These new values are synthesized and them played to Lessac Practitioners who will listen to the results and comment on the speech qualities as compared to the plain use of the multiple databases values for synthesis.

Next they are played to sets of audiences corresponding to audiences that listened to the high-fidelity recordings of Lessac Practitioners. The purpose here is to establish whether the expressive synthesis, with the reduced rule set, can pass the test of understandability equal to or greater than the high-fidelity recording in audiences of non-expert listeners.

The final set of rules and metrics become the database set of rules for associating with the AI assessment and computational linguistics output of marked-up text to be synthesized.

While illustrative embodiments of the invention have been described together with several alternatives for various parts of the system, it is, of course, understood that various modifications will be obvious to those of ordinary skill in the art. Such modifications are within the spirit and scope of the invention, which is limited and defined only by the following claims.

What is claimed is:

1. A method for converting text to speech using a computing device having memory, comprising:
   (a) receiving text into said memory of said computing device;
   (b) applying a set of the lexical parsing rules to parse said text into a plurality of components;
   (c) associating pronunciation and meaning information with said components;
   (d) applying a set of phrase parsing rules to generate marked up text;
   (e) phonetically parsing said marked up text using phonetic parsing rules;
   (f) parsing said marked up text using Lessac expressive parsing rules;
   (g) storing a plurality of sounds in memory, each of said sounds being associated with said pronunciation information; and
   (h) recalling the sounds associated with said text to generate a raw speech signal from said marked up text after said parsing using phonetic and expressive parsing rules.

2. A method as in claim 1, comprising filtering said raw speech signal to generate an output speech signal.
   (h) filtering said raw speech signal to generate an output speech signal.

3. A method for converting text to speech using a computing device having a memory, comprising:
   (a) receiving a text comprising a plurality of words into said memory of said computing device;
   (b) deriving a plurality of phonemes from said text;
   (c) associating with each of said phonemes a prosody record based on a database of prosody records associated with a plurality of words;
   (d) applying a first set of the artificial intelligence rules to determine context information associated with said text;
   (e) for each of said phonemes:
      (i) determining context influenced prosody changes;
      (ii) applying a second set of rules based on Lessac theory to determine Lessac derived prosody changes;
      (iii) amending the prosody record in response to said context influenced prosody changes and said Lessac derived prosody changes;
      (iv) reading from said memory sound information associated with said phonemes;
      (v) amending said sound information based on the prosody record as amended in response to said context influenced prosody changes and said Lessac derived prosody changes to generate amended sound information; and
   (f) outputting said sound information to generate a speech signal.

4. A method for converting text to speech as in claim 3, wherein the prosody of said speech signal is varied whereby increased realism is achieved in said speech signal.

5. A method for converting text to speech as in claim 3, wherein the prosody of said speech signal is varied in a manner which is random or which appears to be random, whereby increased realism is achieved in said speech signal.

6. A method for converting text to speech as in claim 3, wherein said sound information is associated with different speakers, and a set of artificial intelligence rules are used to determine the identity of the speaker associated with the sound information that is to be output.

7. A method of converting text to speech as in claim 3, wherein said amending of the prosody record in response to said context influenced prosody changes is based on the words in said text and their sequence.

8. A method of converting text to speech as in claim 3, wherein said amending of the prosody record in response to said context influenced prosody changes is based on the emotional context of words in said text.

9. A method for converting text to speech as in claim 8, wherein the prosody of said speech signal is varied whereby increased realism is achieved in said speech signal.

10. A method for converting text to speech as in claim 9, wherein the prosody of said speech signal is varied in a manner which is random or which appears to be random, whereby increased realism is achieved in said speech signal.

11. A method for converting text to speech as in claim 10, wherein said sound information is associated with different speakers, and a set of artificial intelligence rules are used to determine the identity of the speaker associated with the sound information that is to be output.

12. A method of converting text to speech as in claim 11, wherein said amending of the prosody record in response to said context influenced prosody changes is based on the words in said text and their sequence.

13. A method as in claim 12, further comprising filtering said speech signal to obtain a filtered amended sound information signal, said filtered amended sound information signal being output to generate a speech signal.

14. A method as in claim 13, wherein said filtering of said amended sound information comprises introducing echo.

15. A method as in claim 13, wherein said filtering of said speech signal comprises passing said amended sound information through an analog or digital resonant circuit wherein the resonance characteristics keyed to vowel information.

16. A method as in claim 13, wherein said filtering of said speech signal comprises damping said amended sound information.

17. A method as in claim 12, further comprising filtering said speech signal by introducing echo, passing said amended sound information through an analog or digital resonant circuit wherein the resonance characteristics keyed to vowel information, and damping said amended sound information.

18. A method as in claim 3, further comprising filtering said speech signal by introducing echo, passing said amended sound information through an analog or digital resonant circuit wherein the resonance characteristics keyed to vowel information, and damping said amended sound information.

19. A method as in claim 3, further comprising adding background sound logically consistent with the context of said text in response to artificial intelligence rules operating on said text and/or in response to a human input.

20. A method, comprising:
   (a) examining a text to be spoken to an audience for a specific communications purpose;
   (b) marking-up said text according to a phonetic markup systems, wherein the phonetic markup system comprises the Lessac System pronunciation rules notations;
   (c) implementing a set of rules to control a speech to text generator based on speech principles, wherein the speech principles are Lessac principles;
   (d) using a computer to speak said marked-up text expressively;
   (e) repeating the step of using a computer to speak said marked-up text expressively using alternative pronunciations of the selected style of expression wherein each of the tonal, structural, and consonant energies having a different balance in the speech, are also spoken;
   (f) listening to said spoken speech generated by said computer;
   (g) evaluating said spoken speech generated by said computer for consistency with style criteria and/or expressiveness;
   (h) assembling an audience;
   (i) playing back said spoken speech generated by said computer to said audience;
   (j) evaluating comprehension by said audience of spoken speech generated by said computer correlated to a particular implemented rule or rules; and
   (k) selecting out those rules providing high audience comprehension.

21. A method for converting input text to a synthesized speech output using a computing device having memory, the method comprising:
   (a) receiving the input text into the computing device memory;
   (b) applying a set of the lexical parsing rules to parse said text into a plurality of components;
   (c) associating pronunciation and meaning information with said components;
   (d) applying a set of phrase parsing rules to generate marked up text;
   (e) phonetically parsing said marked up text using phonetic parsing rules and parsing said marked up text using Lessac expressive parsing rules;
   (f) applying artificial intelligence to recognize the meaning of the text and to identify the emotional nature of the message to be communicated;
   (g) employing a grapheme-to-phoneme database to instruct the computing device in appropriate pronunciation to reflect the identified emotion;
   (h) storing a plurality of sounds in memory each of said sounds being associated with said pronunciation information; and
   (i) recalling the sounds associated with said text to generate a raw speech signal from said marked up text after said parsing using phonetic and expressive parsing rules.

22. A method according to claim 21 comprising analyzing the linguistically marked-up text to be synthesized by employing automated computational linguistics to apply the structural, tonal, and consonant rules to place graphemes and phonemes in appropriate sequence for said appropriate pronunciation.

23. A method according to claim 22 comprising different graphemes and phonemes for pronunciation differences of works in different contextual sequences.

24. A method according to claim 22 comprising employing artificial intelligence to analyze the linguistically marked-up text to indicate an intended listener and expressive requirements for the spoken text to be communicated by the output synthesized speech, the expressive requirements being used to modify the pronunciation-indicating graphemes and phonemes and the expressive requirements optionally comprising suitable prosodies including tone changes, rhythms, timing, and structure.

25. A method according to claim 21 comprising employing multiple normalized reference standard databases of natural speech the reference standard databases comprising normalized phoneme sequences and words, both the phoneme sequences and words being properly pronounced for clarity and natural articulation of consonant rules for words spoken individually and in a word sequences.

26. A method according to claim 25 wherein the phonemes and graphemes for the multiple databases are normalized to have an attenuated range of pronunciation rhythms wherein the tonal variation of consonants and vowels is constrained and variations in structural amplitude and resonance are reduced.

27. A method according to claim 21 comprising employing speech training rules, optionally being Lessac system voice use and training rules, as mark-up instructions for use with the phoneme-to-grapheme database, the markup instructions modifying an output consonant or vowel tone, optionally to extend or shorten the duration or rate of change of the consonant or vowel tone or to change up or change down the consonant or vowel tone.

28. A method according to claim 21 comprising employing speech training rules optionally being Lessac system voice use and training rules, as mark-up instructions for use with the phoneme-to-grapheme database, the markup instructions corresponding with modified anatomical structural features affecting tone, resonance, or harmonics and optionally including inverted cone size, lip opening and y-buzz.

29. A method according to claim 21 comprising specifying articulation of consonants, silences, and the randomness of silences, as punctuation elements to provide desired prosody in the output speech.

30. A method according to claim 21 comprising employing artificial intelligence to assess the text and indicate a speech style appropriate to the text message content and employing the indicated speech style to generate an acoustic profile of rhythm, tone change, and modified articulation of the consonants and vowels of the textual words.

31. A method according to claim 21 comprising providing expressive style instructions as variances from normalized sound data of individual word pronunciations and of position-related varied word pronunciations.

32. A method according to claim 31 wherein the variances comprise changes in pitch frequencies, in phoneme duration, in tonal rate of change, and/or changes in the profile of tonal change with time.

33. A method according to claim 31 comprising providing a spoken text message with an expressive style selected according to the need of a particular audience.

34. A method according to claim 31 comprising employing artificial intelligence processing to provide an automated output for modifying the phonemes and graphemes to yield a modified speech output having a desired expressiveness and the speech output optionally having desirable prosodies and having music elements providing the desirable prosodies.

35. A method according to claim 29 comprising synthesizing and playing the modified speech output to the speech practitioners wherein the speech practitioners listen to the modified speech output and comment on the speech qualities as compared to unmodified speech output provided by employing the unmodified multiple databases values for synthesis.

36. A method according to claim 35 comprising playing the modified speech output to sets of audiences corresponding to audiences that listened to the high-fidelity recordings derived from the speech of speech training practitioners and comparing the artificial intelligence generated modified speech output with the output from the practitioners' recordings.

37. A method of creating a phoneme database for use in converting text into a synthesized speech output, optionally according to the text-to-speech conversion method of claim 21, the text being intended to be spoken to a designated audience for a specific communications purpose and the phoneme database creation method comprising:
  (a) employing a plurality of qualified speech training practitioners, the speech training practitioners optionally being certified Lessac practitioners;
  (b) the speech training practitioners examining and pronouncing the text to provide a spoken output in a style of expressive communication according to the meaning of the text to be conveyed and selected to be appropriate for the designated audience, the style optionally being described in a marked up version of the text; and
  (c) generating the phoneme database from the spoken output.

38. A method according to claim 37 wherein the speech training practitioners mark-up the text to be spoken according to notations for pronunciation rules, optionally using Lessac System pronunciation rules notations.

39. A method according to claim 37 comprising the speech training practitioners speaking repetitions of the text using alternative pronunciations of the selected style of expression wherein each of the tonal, Structural, and consonant energies have a different balance in the alternative pronunciations.

40. A method according to claim 37 comprising the speech training practitioners each listening to each performance of the other practitioners and noting how accurately the spoken performance follows the marked-up text, the practitioners optionally noting whether the performance fulfills style criteria and expresses the meaning of the text to be conveyed.

41. A method according to claim 40 wherein performances failing to meet criteria for accurate compliance with the marked-up text or for style are not included in performance collections included in the databases.

42. A method according to claim 40 comprising the audience judging the high-fidelity performances according to one or more criteria selected from the group consisting of criteria regarding: the understandablilty of the speaker; the listeners' feelings about the speaker; the authenticity of the speaker; the style of delivery; and the emotional state of the speaker.

43. A method according to claim 37 comprising saving a collection of accepted speech training practitioners' performances in a high fidelity recorded form to provide an acoustic database of expressive performances for the selected text.

44. A method according to claim 43 comprising outputting the accepted speech training practitioners' performances to an audience of listeners having an educational achievement level selected from the group consisting of: less than a high school diploma; a high school diploma only; and an undergraduate college degree.

45. A method according to claim 44 comprising constructing a rules set to control the application of artificial intelligence to the synthesis of speech from the text.

46. A method according to claim 45 comprising treating each rule as an independent variable, performing a multiple-discriminant statistical analysis to identify a small set of rules having a range of variation in metrics from the normalized works and phrases in the multiple databases, wherein the small rules set embraces a desired percentage, optionally 95%, of the modified phonemes and metrics applied.

47. A method according to claim 45 comprising testing listeners to the synthesized speech output for accurate perception of the synthesized speech output and for correct understanding of the intended meaning of the synthesized speech output.

48. A method according to claim 45 comprising repeating the presentation of pronounced text and testing of listeners, until a desired number of listeners has correctly received the message and understood its meaning and making a final rule selection.

* * * * *